United States Patent [19]

Weseloh et al.

[11] 3,710,774
[45] Jan. 16, 1973

[54] LUBE OIL PUMP DRIVE FOR BALANCER

[75] Inventors: Roger J. Weseloh, Riverdale; Warren R. Whaley, Chicago Heights, both of Ill.

[73] Assignee: Allis-Chalmers Manufacturing Company, Milwaukee, Wis.

[22] Filed: Oct. 26, 1970

[21] Appl. No.: 83,774

[52] U.S. Cl. .............................. 123/192 B, 184/6.28
[51] Int. Cl. ...................... F02b 75/06, F16f 15/28
[58] Field of Search ....... 123/192 B, 196 R; 184/6.28

[56] References Cited

UNITED STATES PATENTS

| | | | |
|---|---|---|---|
| 2,914,137 | 11/1959 | Sykes, Jr. | 184/6.28 X |
| 3,511,110 | 5/1970 | Grieve | 123/192 B X |
| 1,658,979 | 2/1928 | Fisher | 184/6.28 X |
| 1,472,012 | 10/1923 | Leblanc | 123/192 B |

FOREIGN PATENTS OR APPLICATIONS

| | | | |
|---|---|---|---|
| 636,227 | 2/1962 | Canada | 123/192 B |
| 844,071 | 10/1960 | Great Britain | 123/192 B |

Primary Examiner—Manuel A. Antonakas
Attorney—Arthur L. Nelson, Kenneth C. McKivett and Robert B. Benson

[57] ABSTRACT

An engine balancer for a four cylinder in line internal combustion engine for balancing secondary vibration.

9 Claims, 8 Drawing Figures

PATENTED JAN 16 1973

Inventors
Roger T. Wecelph
Warren R. Whalen

By
Attorneys

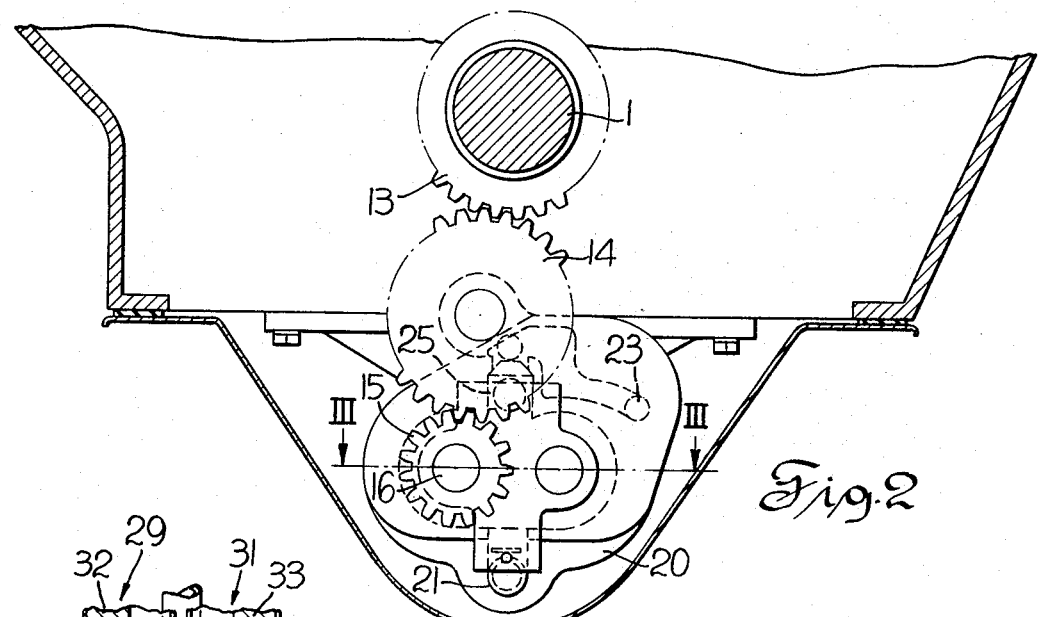
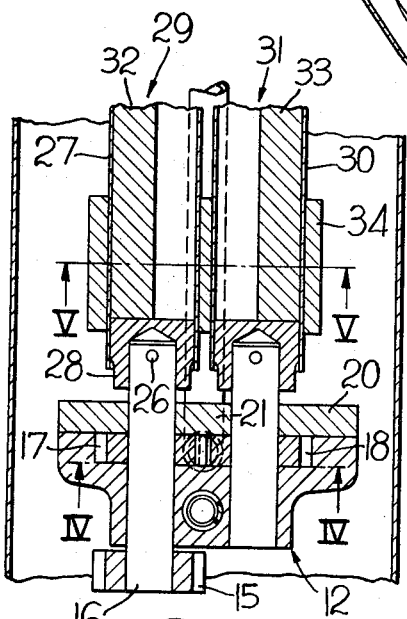
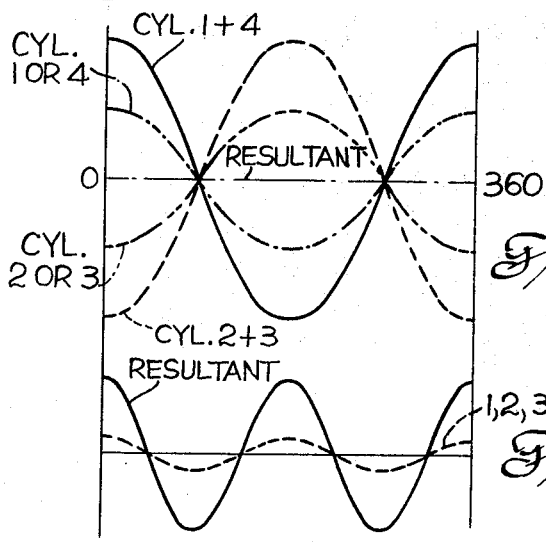
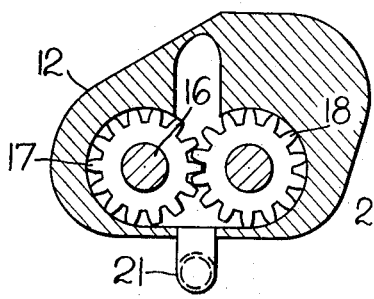
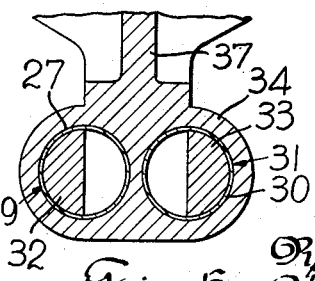

LUBE OIL PUMP DRIVE FOR BALANCER

This invention relates to an engine balancer and more particularly to a secondary vibration balancer for a four cylinder in line internal combustion engine having crank arms lying in a common plane with the crank arms at each of the two ends of the crank shaft 180° out of phase with the center two crank arms.

Internal combustion engines of the reciprocating type set up an unbalance through the rotation of the crank pins and crank arms which produces centrifugal forces causing the shaft to bend in response to the unbalanced forces imposed on it. The effect is increased by the centrifugal effect of the large end of the connecting rod which is surrounding the crank pins. The vertical component produces a force which tends to cause the engine to bounce in a vertical direction. Engine balancing is in itself a very complicated and extensive study and to enter into the complete analysis at this point serves no real purpose. The basic principles involved, however, will be set forth for a four cycle four cylinder engine. It is assumed that the engine has a conventional crank arrangement wherein the crank arms at each end of the crank shaft are 180° out of phase with the two center crank arms. Let us assume that the forces which we are mainly concerned with will be represented by a primary and a secondary force, the primary forces being the forces caused by the unbalance of the crank arms and the crank pins relative to the central rotation of the crank shaft about its main bearings. The crank arms are connected to the crank pins which rotatably supports the large end of the connecting rod which further increases the mass which rotates about the axis of the rotation in the main bearings. This portion of the crank shaft and the mass of the large bearing of the connecting rod is usually counterbalanced by counterweights on the crank shaft. The frequency of these forces in a vertical plane is the frequency of the engine speed, in other words, the speed of rotation of the crank shaft. Providing counterbalancing for these unbalanced forces presents no real problem.

A secondary unbalance is produced by the forces of the piston and the connecting rod. These forces are basically reciprocating forces and are essentially directed in a vertical plane. These forces are brought into existence by the effect of the angularity of the connecting rod and varying the ratio of the rod to the crank arm lengths and these forces are produced at a rate of twice the frequency of the primary forces. Accordingly, these forces are considered forces of the second order since their frequency is twice that of engine speed.

With the conventional four cylinder engine design in which the first and fourth crank arms are 180° out of phase with the second and third crank arms the primary forces counterbalance each other since the 1 and 4 primary forces are always opposite and equal to the magnitude of the primary forces in the crank arms 2 and 3. Accordingly, the four cylinder engine of this design is dynamically balanced, since the four crank arms counterbalance themselves through the crank shaft.

Considering the secondary forces the frequency of these forces is twice that of the primary forces, and accordingly, the secondary forces are in the same direction and are the same magnitude and one period is completed in half an engine revolution. The resultant of the secondary forces in a four cylinder engine of this design is four times the force of any one cylinder in the engine. The unbalanced secondary forces can develop a considerable magnitude and accordingly, some form of balancing must be incorporated in the engine.

Accordingly, this invention provides a balancing mechanism for counterbalancing the secondary forces produced in a four cylinder in line engine in which the first and fourth crank arms are 180° out of phase with the second and third crank arms. The counterweights are mounted on shafts parallel with the crank shaft and include counterweights on shafts which rotate in the opposite direction relative to each other in order that the horizontal component of each counterweight are canceled by each other. Only the vertical component is effective in counteracting the reciprocal force acting through the center line of the crank shaft. A drive mechanism between the crank shaft drives the counterweights at twice the speed of the crank shaft. The drive mechanism between the crank shaft and the counterweights includes the lubrication oil pump which is used to provide forced lubrication of the moving components in the engine. A further refinement of the invention provides for shafts which rotate eccentrically and produce an unbalance force counteracting the unbalance forces of the engine and neutralize their effect and reduce vibration and noise in the engine.

Accordingly, it is an object of this invention to provide an engine balancer to counterbalance unbalance forces in the four cylinder engine.

It is another object of this invention to provide a balancing device for a four cylinder four cycle engine for secondary vibrations 180° out of phase with the engine unbalance.

It is a further object of this invention to provide a secondary order vibration balancer for a four cylinder engine having all crank pins in the common plane with the first and fourth crank arms 180° out of phase with the second and third crank arms.

It is a further object of this invention to provide in a four cylinder in line engine having first and fourth crank arms 180° out of phase with the second and third crank arms an engine balancer for balancing second order vibration produced by the engine driven through the lubrication pump.

It is a further object of this invention to provide an engine balancer for secondary vibration with drive means including the lubrication oil gear pump in a four cylinder in line engine wherein the counterweights include eccentrically weighted shafts extending substantially the length of the engine.

The objects of this invention are accomplished in a four cylinder in line engine with the crank shaft having the first and fourth crank arms 180° out of phase with the second and third crank arms. The crank shaft drives through idler gears and a lubrication oil gear pump. The gear pump includes two pumping gears which in turn drive two counterweights. The counterweights are formed by two shafts extending substantially the length of the crank shaft and mounted for parallel rotation with the crank shaft. The counterweights comprise shafts having means for eccentrically weighting them to produce a counterbalance for the unbalance of the engine in the vertical plane. The counterweights are mounted with an axis rotating in a horizontal plane and rotate in opposite directions so that the counterweight unbalance is canceled in the horizontal plane. The vertical component of the counterweights is 180° out of phase with the engine unbalance and produces a vertical component to counterbalance the forces of the engine produced by second order vibrations in the engine.

Referring to the drawings, the preferred embodiments of this invention are illustrated.

FIG. 2 is a cross section view of the engine taken on line II—II of FIG. 1.

FIG. 3 is a cross section view taken on line III—III of FIG. 2.

FIG. 4 is a cross section view taken on line IV—IV of FIG. 3.

FIG. 5 is a cross section view taken on line V—V of FIG. 3.

FIG. 6 illustrates a force diagram of the primary enertia forces of a four cylinder engine shown in FIG. 1.

FIG. 7 illustrates the secondary enertia forces of a four cylinder engine as shown in FIG. 1.

FIG. 8 is a cross section view showing a modification of the counterweights.

Figure 1:
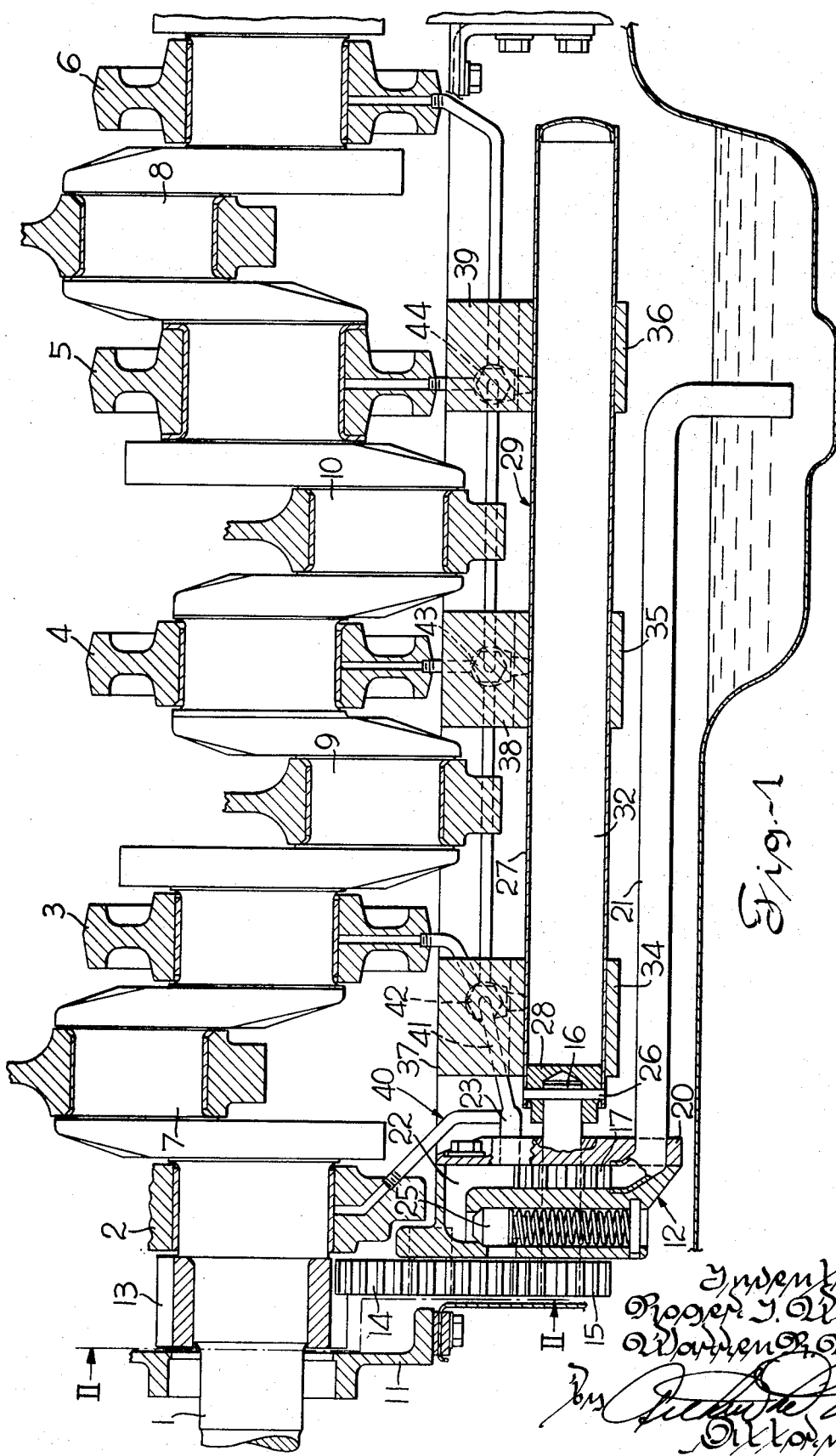
FIG. 1 illustrates a cross section view of the engine showing a counterweight and the lubricating oil pump in section as well as the crankshaft.

Referring to the drawing, crankshaft 1 is mounted on the main bearings 2, 3, 4, 5 and 6. The one and four crank arms indicated by 7 and 8 are 180° out of phase with the two and three crank arms indicated by 9 and 10 respectively.

The crank shaft 1 is mounted in the engine housing 11 which supports the oil pump 12 on its underside. The crank shaft 1 carries a driving gear 13 which meshes with an idler gear 14 which also drives the driven gear 15. The driven gear 15 is connected to a shaft 16 which is also connected to an oil pumping gear 17 which also drives the second oil pumping gear 18 in the oil pump 12. The shaft 16 is also mounted in the pump housing 20.

The pump housing defines a pumping chamber with the gears 17 and 18. The inlet conduit 21 supplies oil to the lower portion of the gears 17 and 18 and the rotation of the gears carries the lubricating oil to the chamber 22 on the upper portion of the lubricating pump 12. The chamber 22 is in communication with the outlet passage 23 which also is connected to the two outlet conduits 40, 41 which supplies pressurized lubricating oil to the lubricating oil system. Lubricating oil system provides forced lubrication to the crank pin bearings, the main bearings and counterweight bearings. The pressure relief valve 25 is connected to high pressure side of the pump 12 to accommodate excess flow through the pump which is not needed in the lubricating system.

The pumping gears 17 and 18 are each fitted with a shaft which rotates with the gear. A connection is shown on the shaft 16 which includes a pin 26 extending through the shaft 16 and also through the sleeve 27. The sleeve 27 is formed with an end wall 28 through which the pin 26 also extends. The pin 26 fixes the end wall 28 to the shaft 16 and accordingly rotates the sleeve 27. The sleeve 27 also has a plug in its opposite end.

The sleeve 27 forms a counterweight 29 driven by the gear 17. A similar sleeve 30 is also driven by the gear 18 which forms counterweight 31 connected to the gear 18 and is driven in the opposite direction from the counterweight 29 formed by the sleeve 27. The counterweights 29 and 31 operate similar to a Lancaster type engine balancer whereby the horizontal forces are canceled by the rotation of the counterweights and the effective counterbalance is provided essentially in the vertical plane. Each counterweight comprises a sleeve which is filled on its one side to produce a sleeve eccentrically rotated on an axis other than the center of gravity.

FIG. 3 illustrates a manner in which the counterweight 29 has a weighted portion 32 such as lead or other dense material and the counterweight 31 formed by the sleeve 30 also has a weighted portion 33.

Each of the counterweights is mounted in three bearings as illustrated in FIG. 1, the bearings 34, 35 and 36 support the counterweight 29. Each of the bearings 34, 35 and 36 are mounted on a supporting structure 37, 38 and 39 respectively which are in turn supported on the engine housing 11. The lubricating system 40 is connected to the conduit 41 which has fittings 42, 43 and 44 for lubricating the bearings 34, 35 and 36. The counterweight 31 is similarly supported and lubricated as is counterweight 29 and accordingly a further description of such supporting and lubrication structure will not be needed.

While the drive connection as illustrated between the pumping gears and counterweights is a pin, it is understood that a spline, a key, or other suitable means might also provide a drive means between the gears and the counterweights. It is also understood that although sleeves are shown with weighted portions containing such as steel or lead that a steel shaft or other heavy metal shaft might also be used as a counterweight. A full steel bar or shaft with a milled flat on its side would provide the eccentricity required to produce a counterweighting effect for the engine. FIG. 8 illustrates such a modification of a counterweight. It is understood, however, if the counterweight were not circular it would splash oil when in operation and accordingly the sleeve provides the added advantage of reducing splash while in rotation.

Referring to FIG. 6 and FIG. 7, the primary and secondary inertia forces such as produced in an engine as shown in FIG. 1 are illustrated. FIG. 6 illustrates the primary unbalance force created by the one or four crank arms and are labeled 1 or 4 while the line labeled 2 or 3 illustrates the unbalanced forces of the two or three crank arms. A summation of the unbalance forces of the one crank arm and the four crank arm is shown by the line labeled 1 plus 4 while the line labeled 2 plus 3 indicates the summation of the unbalance forces of two and three crank arms. It is noted that the resultant force of the engine indicated by the line labeled resultant force is zero, inasmuch as the unbalance of the primary inertia forces cancel each other in an engine design as that shown in FIG. 1.

Referring to FIG. 7 the secondary inertia forces of the four cylinder engine are also shown. The line labeled 1, 2, 3 or 4 illustrates the unbalance force by any of the number one, two, three, or four crank arms. The line labeled resultant force illustrates that the resultant of the secondary forces are additive and the resultant force illustrates the total force which is the summation of the unbalance forces of all of the secondary forces. Accordingly, it is the secondary inertia forces which we are interested in balancing with the engine as shown. Unbalanced forces are neutralized by balancing device as described.

The operation of the balancing device will be described in the following paragraphs. Referring to FIG. 1, the crank shaft 1 rotates during operation of the engine. The drive gear 13 drives the idler gear 14 which in turn drives the driven gear 15. The driven gear 15 is driven at twice the speed of the drive gear 13. The driven gear 15 connected to the pumping gear 17 which carries the same number of teeth and has the same pitch diameter as the pumping gear 18. The rotation of pumping gear 17 causes a counterrotation of the pumping gear 18. The pumping gears 17 and 18 accordingly are driven at twice the rate of rotation as the crankshaft 1.

The pumping gears 17 and 18 are in turn connected to the counterweights 29 and 31 thereby causing the counterweights to rotate at twice the rotation of the crank shaft. The phase relationship of the counterweights 29 and 31 are such that when the resultant force at 0° rotation as shown in FIG. 7 is positive and at a maximum vertically upward, the counterweight force is negative and downward which counterbalance the engine unbalance. Since the frequency of the secondary inertia forces is twice that of the crank shaft frequency the engine balancer must rotate at twice the engine speed. The frequency of the secondary inertia forces shown in FIG. 7 are additive since the one and four crank arms are 180° out of phase with the two and three crank arms. Accordingly with the secondary inertia forces being additive, the speed of rotation of the balancer being twice the speed of the crank shaft rotation the balancer neutralizes the unbalanced forces of the engine. The counterweights 29 and 31 extend substantially the length of the crank shaft and therefore produce a counterbalancing force which tends to eliminate any unbalanced couple which may be acting on the crankshaft itself.

The engine lubricating pump 12 provides a dual function of providing a source of pressurized oil for the lubricating system while also providing a drive means for the counterweights. This construction simplifies the engine design and provides a reduced number of parts in the engine. Not only are the number of parts in the engine reduced but it saves space which is critical in this portion of the engine. The counterweight device is lubricated by the same lubricating system as the moving parts of the engine. The engine balancer can utilize eccentrically mounted shafts to produce the counterbalance forces. The lubrication and the support of the shafts can be modified so long as the balancing desired is produced and with the primary force canceling out due to engine design.

The embodiments of the invention in which an exclusive property or privilege is claimed are defined as follows:

1. An engine balancer for a four cylinder in line engine comprising, a crankshaft with the crank arms lying in a common plane, means rotatably supporting said crankshaft for rotating on an axis of rotation, an oil lubrication pump including a pair of gears mounted for rotation about axes parallel with the axis of rotation of said crankshaft and mounted at the end of said crankshaft, gears connected to said crankshaft and said pump driving said pair of gears at twice the speed of the crankshaft, a counterweight adjacent said crankshaft defining an eccentric portion extending for substantially the length of said crankshaft connected to each gear of said pair of gears, bearing means supporting said counterweights at intervals along the length of said counterweights, means for driving said eccentric portion of the first of said counterweights for rotating at 180° out of phase with said eccentric portion of the second counterweight and each of said counterweights rotating at twice the crankshaft speed for counterbalancing secondary unbalance of said engine.

2. An engine balancer for a four cylinder in line engine having a crankshaft with crank arms lying in a common plane as set forth in claim 1 wherein said counterweights define shafts rotating eccentrically for balancing said engine.

3. An engine balancer for a four cylinder in line engine having a crankshaft with the crank arms lying in a common plane as set forth in claim 1 including means defining an engine oil compartment receiving said counterweight, said counterweights define a sleeve having a weighted portion on one side of said sleeve to form enclosed counterweights to avoid splashing of oil in the oil compartment.

4. An engine balancer for a four cylinder in line engine having a crankshaft with crank arms lying in a common plane as set forth in claim 1 including said oil lubrication pump, said gears driving said pair of gears includes an idler gear driven by a crankshaft gear and driving said pair of gears of said oil pump whereby said counterweights are driven through said lubrication pump.

5. An engine balancer for a four cylinder in line engine having a crankshaft with crank arms lying in a common plane as set forth in claim 1 including a filled bearing housing receiving said counterweights defining a thin wall between said counterweights to thereby provide parallel close center relationship of said counterweights.

6. An engine balancer for a four cylinder in line engine having a crankshaft with crank arms lying in a common plane as set forth in claim 1 wherein an engine lubricating system is connected to said lubrication pump and connected to said bearing means to provide lubrication of the counterweight bearings.

7. An engine balancer for a four cylinder in line engine having a crankshaft with crank arms lying in a common plane as set forth in claim 1 wherein said gears connecting said counterweights synchronously rotate said counterweights in opposite directions to neutralize the counterbalancing forces in a horizontal plane and overcoming unbalance in a vertical plane.

8. An engine balancer for a four cylinder in line engine having a crankshaft with crank arms lying in a common plane as set forth in claim 1 including means positioning intersecting pitch diameter of each of said pumping gears on a vertical axis coincidental with the crankshaft axis.

9. An engine balancer for a four cylinder in line engine having a crankshaft with crank arms lying in a common plane as set forth in claim 1 including means connecting said counterweights for coaxial rotation with said pumping gears, means positioning said lubrication pump in the forward end on the lower side of said engine, said counterweights thereby extending on the underside of said engine to counteract vertical secondary unbalance forces of said engine.

* * * * *